(12) United States Patent
Durand

(10) Patent No.: US 12,492,766 B2
(45) Date of Patent: Dec. 9, 2025

(54) METHOD FOR SEALING A JUNCTION HAVING A CONTACT SURFACE AND A COUNTER-CONTACT SURFACE OF AN ELEMENT OF A COMPARTMENT OF A GAS-INSULATED SUBSTATION, AND RESULTING JUNCTION

(71) Applicant: RTE RESEAU DE TRANSPORT D'ELECTRICITE, Paris la Défense (FR)

(72) Inventor: Fabrice Durand, Bron (FR)

(73) Assignee: RTE RESEAU DE TRANSPORT D'ELECTRICITE, Paris la Défense (FR)

( * ) Notice: Subject to any disclaimer, the term of this patent is extended or adjusted under 35 U.S.C. 154(b) by 78 days.

(21) Appl. No.: 18/708,482

(22) PCT Filed: Nov. 24, 2022

(86) PCT No.: PCT/IB2022/061393
§ 371 (c)(1),
(2) Date: May 8, 2024

(87) PCT Pub. No.: WO2023/095056
PCT Pub. Date: Jun. 1, 2023

(65) Prior Publication Data
US 2025/0003535 A1    Jan. 2, 2025

(30) Foreign Application Priority Data
Nov. 29, 2021 (EP) ..................................... 21306656

(51) Int. Cl.
*F16L 23/16*      (2006.01)
*H02B 13/045*  (2006.01)

(52) U.S. Cl.
CPC .......... *F16L 23/165* (2013.01); *H02B 13/045* (2013.01)

(58) Field of Classification Search
CPC ............................ F16L 23/165; H02B 13/045
See application file for complete search history.

(56) References Cited

U.S. PATENT DOCUMENTS 3,066,823 A    12/1962 Baker
3,388,724 A *  6/1968 Mascenik ............. F16L 59/141
                                                               138/149

(Continued)

FOREIGN PATENT DOCUMENTS

CN    102842863 A    12/2012
EP    0 090 436 A2   10/1983

(Continued)

OTHER PUBLICATIONS

FR International Search Report as issued in International Patent Application No. PCT/IB2022/061393, dated Jan. 19, 2023.

*Primary Examiner* — Craig M Schneider
*Assistant Examiner* — Christopher D Ballman
(74) *Attorney, Agent, or Firm* — Pillsbury Winthrop Shaw Pittman LLP

(57) ABSTRACT

A method for sealing a junction with a contact surface and counter-contact surface of an element of a compartment of a gas-insulated substation includes an injection of a sealing product into an inter-seal volume formed between the contact surface and counter-contact surface by using a leakage recovery duct opening into the inter-seal volume. During injection, the sealing product is in the form of a liquid whose kinematic viscosity, measured at 40° C. under 1 atm, is greater than or equal to 3000 mm2/s. Injection is carried out under pressure by a plurality of successive increases in injection pressure until any residual gas is expelled from the (Continued)

Figure 1:
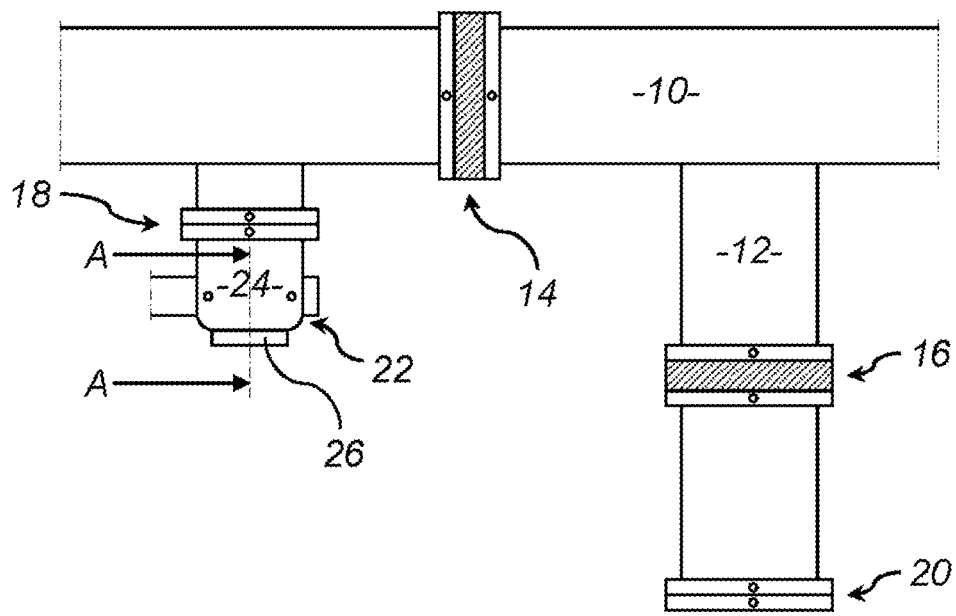

inter-seal volume by pressurized leakage of this residual gas via at least one of the two mechanical seals.

13 Claims, 4 Drawing Sheets

(56) References Cited

U.S. PATENT DOCUMENTS

| | | | | |
|---|---|---|---|---|
| 4,679,598 A * | 7/1987 | Jee | ............................ | F16L 53/32 |
| | | | | 166/302 |
| 6,168,163 B1 * | 1/2001 | Thorson | ................ | F16J 15/3488 |
| | | | | 277/420 |
| 7,367,398 B2 * | 5/2008 | Chiesa | ..................... | E21B 36/00 |
| | | | | 166/61 |
| 8,146,924 B2 * | 4/2012 | Ohmi | .................... | F16J 15/0887 |
| | | | | 277/654 |
| 8,534,306 B2 * | 9/2013 | Ayers | ......................... | F16L 1/26 |
| | | | | 137/15.14 |
| 9,347,565 B2 * | 5/2016 | Berger | ................. | F16J 15/3404 |
| 10,141,807 B2 * | 11/2018 | Biro | ......................... | H02K 3/28 |
| 10,914,134 B1 * | 2/2021 | Harbi | ...................... | E21B 33/14 |
| 10,982,508 B2 * | 4/2021 | Rebello | ................... | F16L 55/18 |
| 11,428,623 B2 * | 8/2022 | Liu | ......................... | G01N 17/04 |
| 12,104,697 B2 * | 10/2024 | Treier | .................... | F16J 15/104 |
| 2002/0145108 A1 * | 10/2002 | Rodi | ................. | G01D 5/34738 |
| | | | | 250/231.14 |
| 2005/0155663 A1 * | 7/2005 | Dhellemmes | .......... | F16L 59/029 |
| | | | | 138/148 |
| 2010/0319435 A1 * | 12/2010 | Strong | .................. | G01M 3/002 |
| | | | | 324/700 |
| 2020/0088663 A1 * | 3/2020 | Karschnia | ............... | F16L 59/14 |

FOREIGN PATENT DOCUMENTS

FR           2 489 918 A1    3/1982
KR       10-0988068 B1    10/2010

* cited by examiner

METHOD FOR SEALING A JUNCTION HAVING A CONTACT SURFACE AND A COUNTER-CONTACT SURFACE OF AN ELEMENT OF A COMPARTMENT OF A GAS-INSULATED SUBSTATION, AND RESULTING JUNCTION

CROSS-REFERENCE TO RELATED APPLICATIONS

This application is the U.S. National Stage of PCT/IB2022/061393, filed Nov. 24, 2022, which in turn claims priority to European patent application number 21306656.6 filed Nov. 29, 2021. The content of these applications are incorporated herein by reference in their entireties.

The present invention relates to a method for sealing a junction having a contact surface and a counter-contact surface of an element of a compartment of a gas-insulated substation. It also relates to a junction having a contact surface and counter-contact surface resulting from such sealing.

In the context of a compartment element in a GIS (for "Gas-Insulated Substation"), it is generally sulfur hexafluoride or $SF_6$ that is at risk of leaking, since this gas circulates under pressure in the compartment as a high-performance electrical and possibly thermal insulator. Although this gas is non-toxic and, a priori, harmless to humans, it is a greenhouse gas whose global warming potential is 22,800 times greater than that of carbon dioxide. Its consumption also has a cost. It is therefore important to prevent or avoid any leakage of such a gas into the atmosphere.

In complex GIS compartment elements with portions connected to each other or to limit devices, the connections are made using flange and counter-flange junctions, shaft and bore junctions, rupture discs, density monitoring devices, insulating wafers between flanges, mechanical seals, and constitute the weak points from which leaks are most likely to occur, especially when the gas is present under pressure in the compartment. But when leaks are light, diffuse and the gas is difficult to detect because it is colorless or odorless, they are often difficult or impossible to locate precisely.

Furthermore, sealing such leaks while keeping the GIS compartment wherein they occur under pressure and voltage for live-line working is often a delicate operation. Dismantling the assemblies in order to revise the bearing surfaces and change the mechanical seals is generally out of the question, even though this would be the ideal solution. Pipes and other GIS compartment elements are particularly delicate and time-consuming to dismantle. There is also the problem of unavailability of the entire structure, and in particular of a portion of the power transmission network that uses such GIS compartments when they have to be dismantled, which causes major inconvenience in terms of operations. For this reason, it is necessary to offer sealing solutions that do not require dismantling or operating interruption.

Several methods are mainly known for solving, at least temporarily, gas leakage problems on flanged junctions of GIS compartment pipelines without interrupting their operation, in particular by maintaining the gas pressure and electrical voltage therein.

According to a first method, a strip of fabric, for example of resin-impregnated glass fabric, is wound over the flanged junction and in its vicinity on either side of the junction to form a tourniquet. This method of external sealing appears simple, but presents a difficulty in installation under pressure. In addition, the surface condition of the flanged junction must be prepared to facilitate adhesion of the strip. It also prevents the flanged junction from being accessed at a later date, and prevents it from being dismantled. Finally, such a sealing must withstand the pressure of the leaking gas, and is generally not durable.

According to a second method for external sealing, an enclosure is created around the flange junction by means of a hermetic shuttering, this enclosure thus constituting a leakage recovery device arranged downstream of the leakage zone, and a polymerizable liquid resin, a pressurized gas or a preformed seal is optionally injected into it through an opening provided for this purpose. Not only can the hermetic shuttering be heavy and cumbersome, or even impossible to install due to support, tie rod or framing constraints, but the gas leakage also remains confined in an enclosure at a pressure at least equal to that inside the pipe. A sealing of this type is therefore difficult to maintain over time. Moreover, if the enclosure is filled with polymerizable resin, all subsequent access to the flanged junction is prevented.

According to a third method, a sealing product is injected between the flanges of the junction. More precisely, a flange is perforated and the product is injected at the level of the insulating wafer. The product is supposed to go around the flange, filling any gaps and stopping the leakage by forming a new sealing. Several embodiments of this method for internal sealing are for example taught in patent document FR 2 489 918, in a more general context than that of GIS compartments. According to this document, it requires machining specifically designed for injection, but has the advantage of being able to take advantage of the presence of a leakage recovery duct in at least one of the flanges of the pipe junction to carry out the injection.

According to the general principles of this third method, the invention applies more particularly to a method for sealing a junction with a contact surface and counter-contact surface of an element of a compartment of a gas-insulated substation, this junction comprising two mechanical seals clamped between the contact surface and the counter-contact surface, arranged so as to form a closed inter-seal volume delimited by both of the mechanical seals and by the contact surface and counter-contact surface, the method for sealing comprising the injection of a sealing product into the inter-seal volume by use of a leakage recovery duct arranged in the thickness of the compartment, this duct opening into the inter-seal volume.

However, for such a sealing to be complete and stable over time, the pre-existing gas in the inter-seal volume must be completely expelled and replaced by the sealing product. However, the method described in FR 2 489 918 does not provide for this, nor does it enable it to be done simply and efficiently. Gaseous bubbles are almost certain to remain in the inter-seal volume after the sealing product has been injected.

It may therefore be desirable to provide a method for sealing a junction with a contact surface and counter-contact surface which enables at least some of the above-mentioned problems and constraints to be overcome.

A method is therefore proposed for sealing a junction with a contact surface and counter-contact surface of an element of a compartment of a gas-insulated substation, this junction comprising two mechanical seals clamped between the contact surface and the counter-contact surface, arranged so as to form a closed inter-seal volume delimited by both of the mechanical seals and by the contact surface and counter-contact surface, the method for sealing comprising an injection of a sealing product into the inter-seal volume by using a leakage recovery duct arranged in the thickness of the compartment, this duct opening into the inter-seal volume, wherein:

during injection, the sealing product is in the form of a liquid whose kinematic viscosity, measured at 40° C. under 1 atm, is greater than or equal to 3000 mm²/s; and the injection is carried out under pressure by a plurality of successive increases in injection pressure until any residual gas is expelled from the inter-seal volume by pressurized leakage of this residual gas via at least one of the two mechanical seals.

It has been observed that, surprisingly, the simple use of a liquid sealing product of sufficient kinematic viscosity in this context of a gas-insulated substation, i.e. a kinematic viscosity greater than or equal to 3000 mm²/s when measured at 40° C. under 1 atm, combined with a gradual increase in injection pressure, effectively improves the above-mentioned third method. In particular, although injection requires a final pressure well above atmospheric pressure, given the high kinematic viscosity of the sealing product, successive pressure increases enable any residual gas to be gradually replaced by the sealing product in the inter-seal volume. This new method for sealing ensures the absence of any gas bubbles in the inter-seal volume, thanks to this gradual pressure increase, which guarantees that the inter-seal space is completely filled.

Optionally, the sealing product comprises a silicone grease whose kinematic viscosity measured at 40° C. under 1 atm is between 3000 and 7000 mm²/s.

Also optionally, the sealing product comprises solid microparticles, in particular silica microbeads with sizes less than or equal to 10 μm.

Also optionally, injection is carried out using a grease nipple with a non-return valve connected to the leakage recovery duct and held in place after injection.

Also optionally, the plurality of successive increases comprises at least ten successive increases of at least 1 bar each, preferably at least twenty successive increases of at least 1 bar each, from a first injection pressure greater than or equal to 10 bars to a last injection pressure greater than or equal to 40 bars.

Also optionally:

the element of the compartment of the gas-insulated substation is a pipe or pipe end through which electrical components pass in an insulating gaseous atmosphere, in particular a sulfur hexafluoride atmosphere;

the junction is a flange and counter-flange junction of this pipe or pipe end and comprises the two mechanical seals clamped between two respective flat contact surfaces of the flange and counter-flange; and one of the two mechanical seals, known as the inner seal, being arranged inside a space delimited by the other of the two mechanical seals, known as the outer seal, so as to form the inter-seal volume, the method for sealing comprises the use of the leakage recovery duct which is arranged in at least one of the flange and the counter-flange.

Also optionally, the plurality of successive increases in injection pressure takes place up to a maximum injection pressure of at least 60 bars.

Also optionally:

the compartment element of the gas-insulated substation is a disconnecting switch;

the junction is a shaft and bore junction of this disconnecting switch and comprises two mechanical seals clamped between two respective cylindrical contact surfaces of the shaft and the bore; and both of the mechanical seals being arranged at a distance from each other around the shaft so as to form the inter-seal volume, the method for sealing comprises the use of the leakage recovery duct which is arranged in the thickness of the compartment wherein the bore is formed.

Also optionally, the plurality of successive increases in injection pressure takes place up to a maximum injection pressure of at most 50 bars.

A junction is also proposed with contact surface and counter-contact surface of an element of a compartment of a gas-insulating substation, comprising:

two mechanical seals clamped between the contact surface and counter-contact surface, arranged to form a closed inter-seal volume delimited by both of the mechanical seals and by the contact surface and counter-contact surface;

a sealing product injected under pressure into the inter-seal volume using a leakage recovery duct arranged into the thickness of the compartment, this duct opening out into the inter-seal volume;

wherein the sealing product is in the form of a liquid whose kinematic viscosity, measured at 40° C. under 1 atm, is greater than or equal to 3000 mm²/s, in the inter-seal volume which it fills completely without residual gas.

Figure 2:
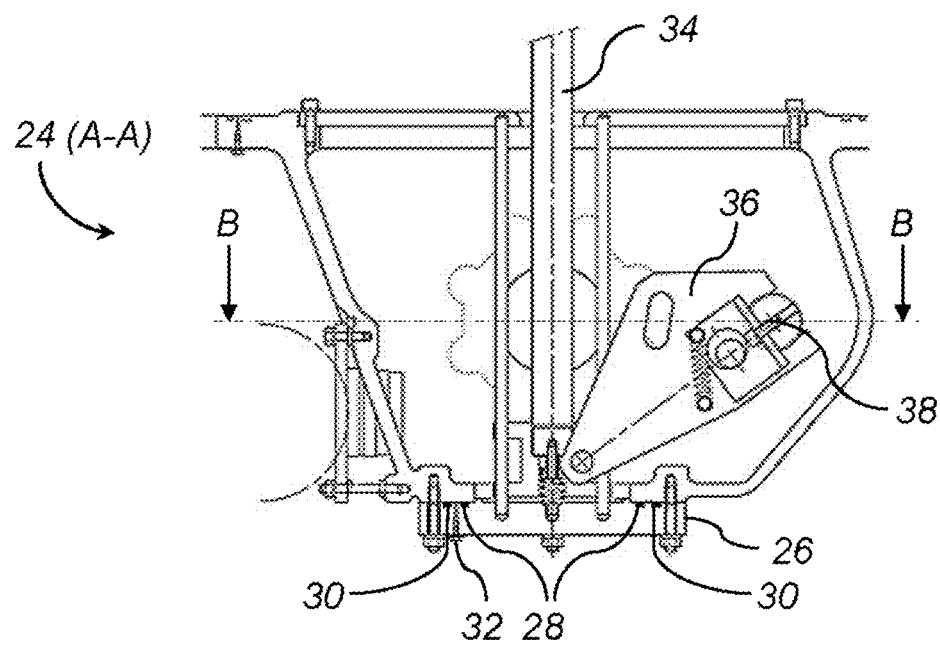
Figure 3:
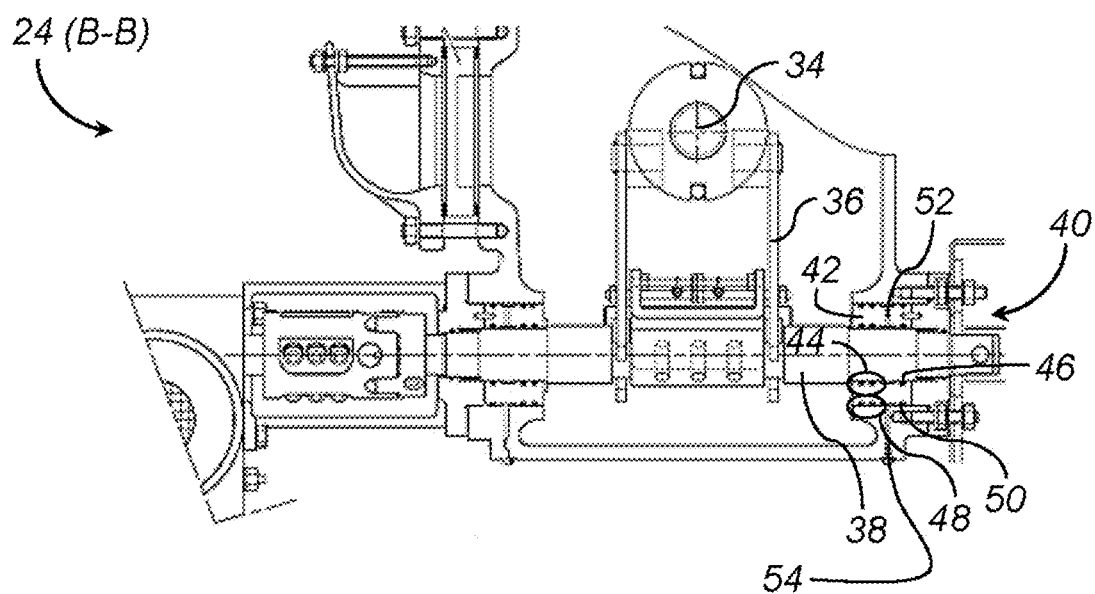
Figure 4:
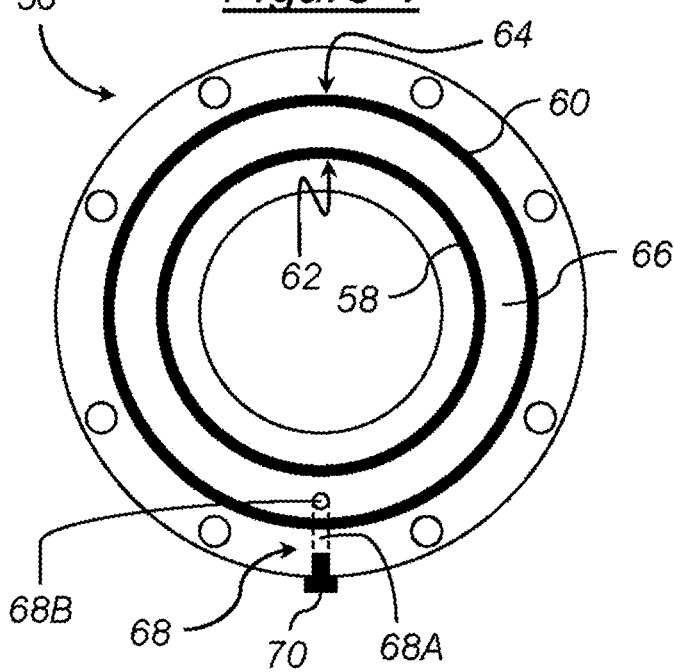
Figure 5:
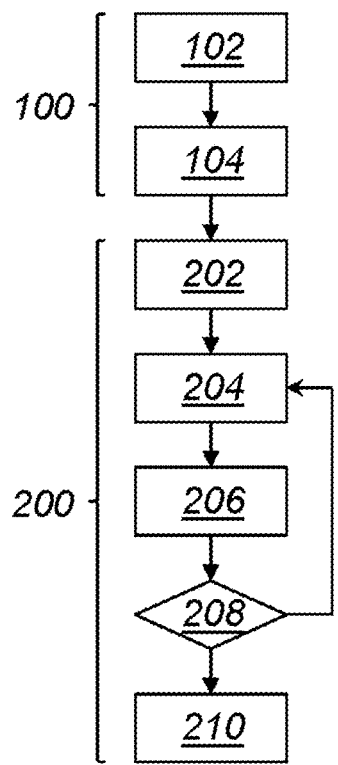
Figure 6:
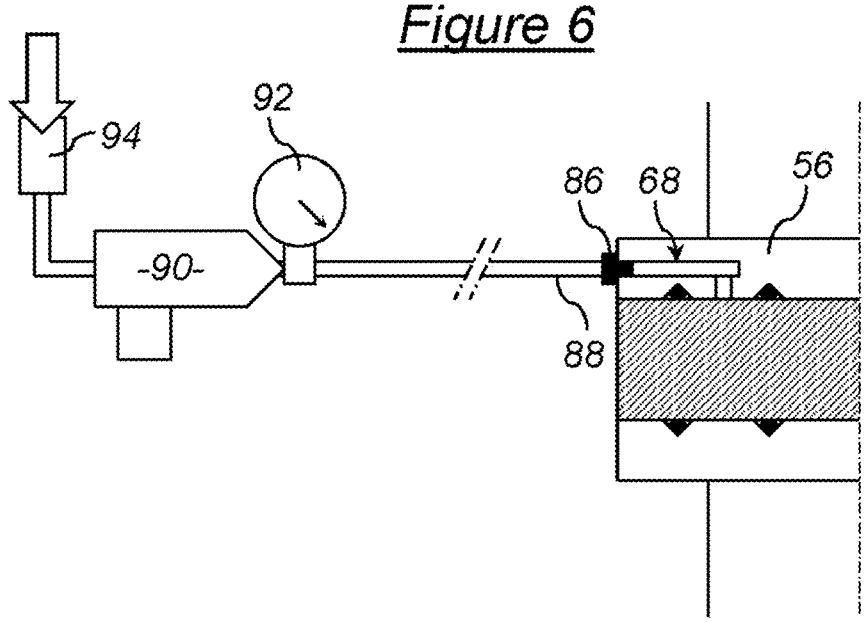
Figure 7:
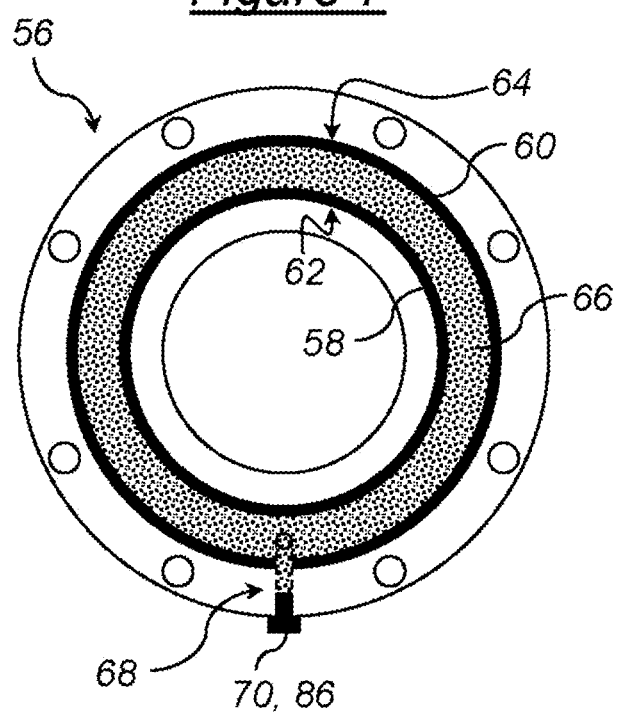

The invention will be better understood with the aid of the following description, given solely by way of example and with reference to the appended drawings wherein:

FIG. 1 shows schematically the general structure of a non-limiting example of a compartment of a gas-insulated substation (or GIS compartment) featuring several flanged and counter-flanged junctions of pipe sections or ends, FIG. 2 shows a schematic cross-sectional view of a disconnecting switch element of one of the pipe sections or ends of the GIS compartment shown in FIG. 1, FIG. 3 shows the disconnecting switch element of FIG. 2 in another cross-section showing a shaft and bore junction for this disconnecting switch, FIG. 4 shows a schematic front view of the flange, or counter-flange, of a flange and counter-flange junction of the GIS compartment shown in FIG. 1, FIG. 5 illustrates the successive steps of a method for sealing a junction with a contact surface and counter-contact surface of an element of the GIS compartment of FIG. 1, according to an embodiment of the invention, FIG. 6 schematically shows the general configuration of an installation for carrying out the method described in FIG. 5, and FIG. 7 shows a schematic cross-section of the general structure of a non-limiting example of a junction with a contact surface and counter-contact surface of a GIS compartment element, according to one embodiment of the invention.

The installation shown in FIG. 1 comprises a pipeline containing a pressurized gas. This is a pipe in a gas-insulated substation compartment, in other words a GIS compartment, wherein cables or other electrical components are passed under an insulating gas atmosphere of sulfur hexafluoride.

By way of purely illustrative and non-limiting example, this pipe has a main branch 10, extending horizontally in FIG. 1, and a secondary branch 12 extending downwards from the main branch 10. In particular, it features various potential pressurized gas leakage zones, notably at the junctions of longitudinal connecting flanges of pipe sections, at the junctions of pipe section flanges or cylindrical tapping on pipe and rupture discs or density monitoring devices, or at the shaft and bore junctions formed in the GIS compartment. All these junctions feature mechanical seals not visible in FIG. 1, including at least a first mechanical seal, known as the inner seal, between the inside of the GIS compartment containing the pressurized gas and a closed inter-seal volume, and a second mechanical seal, known as the outer seal, between the closed inter-seal volume and the outside of the GIS compartment.

For example, the pipe shown in FIG. 1 has two zones, each of which contains two flanges for longitudinally connecting two pipe sections, which are clamped and hermetically screwed together, possibly by means of an insulating wafer. The first zone 14 is located in the main branch 10 and the second zone 16 is located in the secondary branch 12. Each comprises indeed a flange, a counter-flange and an insulating wafer interposed between the flange and the counter-flange.

The pipe further has a third zone 18 wherein a flange for cylindrical tapping on pipe and a disconnecting switch flange are clamped and hermetically screwed together, possibly by means of an insulating wafer. This third zone 18 is located in the main branch 10. It is flanged and counter-flanged, but is illustrated without an insulating wafer.

The pipe further has a fourth zone 20 wherein a pipe portion flange and a rupture disc or density monitoring device are clamped and hermetically screwed together, possibly by means of an insulating wafer. This fourth zone 20 is located at the free end of the secondary branch 12. It is flanged and counter-flanged, but shown without an insulating wafer.

The pipe further features a fifth zone 22 wherein a disconnecting switch drive shaft is inserted, free to rotate but hermetically sealed by means of mechanical seals, into a bore formed in the GIS compartment. This fifth zone 22 is located on the disconnecting switch, itself identified by reference 24, connected to the cylindrical tapping of the main branch 10. It is illustrated in detail in FIG. 2 according to a section A-A of the disconnecting switch 24 shown in FIG. 1.

Other potential leakage zones are present in the pipe illustrated in FIG. 1, such as the lower portion of the disconnecting switch 24, which has a rupture disc 26, but these will not be detailed here.

Each of the aforementioned zones 14, 16, 18, 20 and 22 constitutes a weak point in the pipe that is liable to leakage gas under pressure. This is indeed considered to be the case in the example shown in FIG. 1. As a result, each of these zones is provided with leakage recovery devices, in particular in the form of leakage recovery ducts arranged in the thickness of the GIS compartment.

When assembling the above-mentioned pipe elements, these ducts make it possible to check as the assembly progresses that the mechanical seals, which are clamped between these elements to be assembled so as to form the above-mentioned inter-seal volumes, are correctly fitted. In fact, by pressurizing each inter-seal volume with the corresponding leakage recovery system and using a spirit level to check that it remains pressurized, the correct installation of these mechanical seals can be verified and validated. Leakage recovery ducts generally have no other function, but can be advantageously reused for sealing after assembly.

Thus, in a manner known in the art, the flange and counter-flange of the first zone 14 each have a leakage recovery duct open on their outer cylindrical side wall and opening into a closed inter-seal volume delimited by two concentric mechanical seals, a contact surface of the flange (or respectively of the counter-flange) and a corresponding contact surface of the insulating wafer. The same applies to the flange and counter-flange of the second zone 16.

Also known in the art, the flange and counter-flange of the third zone 18 each have a leakage recovery duct open on their cylindrical side wall and opening into a closed inter-seal volume delimited by two concentric mechanical seals, a contact surface of the flange and a corresponding contact surface of the counter-flange. The same applies to the flange and counter-flange of the fourth zone 20.

Finally, also in a manner known in the art, the disconnecting switch 24 comprises at least two leakage recovery ducts open on its outer wall and each opening into a closed inter-seal volume delimited by two mechanical seals arranged at a distance from one another around the drive shaft and clamped between two respective cylindrical contact surfaces of the drive shaft and of the bore into which it is inserted.

Cross-section A-A of disconnecting switch 24, shown in FIG. 2, illustrates the configuration of rupture disc 26 more precisely. It is screwed against a corresponding contact surface at the bottom of disconnecting switch 24. To seal the junction, two concentric mechanical seals and, for example, O-ring seals are clamped between an upper face of the rupture disk and the contact surface of the disconnecting switch 24. The first of these two mechanical seals, forming an inner joint 28, is arranged inside the space delimited by the second of these two joints, forming an outer joint 30, so as to form a closed inter-seal volume. Access to this inter-seal volume is provided by a leakage recovery duct 32, closed in FIG. 2 by a knurled screw.

Section A-A of the disconnecting switch 24 shown in FIG. 2 also features a disconnecting rod 34 driven in vertical translation inside the GIS compartment by a cam 36, itself rotated by a drive shaft 38.

The drive shaft 38 and its integration in a bore 40 of the disconnecting switch 24 are detailed in FIG. 3 according to a section B-B shown in FIG. 2.

In the right-hand bore 40 of FIG. 3, the drive shaft 38 is fitted with a jointed ring 42. The latter has a cylindrical inner surface in contact with the cylindrical outer surface of drive shaft 38. The junction is sealed by means of two inner O-ring seals 44 arranged around the drive shaft 38 at a distance from an outer O-ring seal 46 of the same diameter also arranged around the drive shaft 38 so as to form a first inter-seal volume around the drive shaft 38.

The jointed ring 42 further has a cylindrical outer surface in contact with the cylindrical inner surface of bore 40. The junction is sealed by means of two inner O-ring seals 48 arranged around the jointed ring 42 at a distance from an outer O-ring seal 50 of the same diameter also arranged around the jointed ring 42 so as to form a second inter-seal volume around the jointed ring 42.

It should be noted that the two inter-seal volumes thus created against the inner and outer surfaces of the jointed ring 42 communicate with each other via at least one channel 52 cut into its thickness. Such a channel 52 can be seen in FIG. 3 at the top of the jointed ring 42. In addition, access to the second inter-seal volume is provided by a leakage recovery duct 54, closed in FIG. 3 by a knurled screw, cut into the wall thickness of the disconnecting switch 24.

It should also be noted that the drive shaft 38 is similarly integrated in another bore located on the left-hand side of FIG. 3. As the integration elements are the same by symmetry, they will not be detailed here.

The flange 56, or counter-flange, of a flange and counter-flange pipe junction is shown schematically in front view in FIG. 4. An O-ring seal sealing system is provided.

More precisely, two concentric O-ring seals 58, 60 are arranged in two respective annular channels 62, 64 provided for this purpose in the contact face of the flange 56 (or counter-flange) to seal the contact with the corresponding counter-flange (or flange), or with the corresponding insulating wafer if applicable. The first smaller-diameter inner O-ring seal 58, designed to provide a seal against pressurized gas inside the pipe, is arranged in the first smaller-diameter channel 62 cut into the contact face of the flange or counter-flange 56. The second larger-diameter external O-ring seal 60, designed to provide an external seal, in particular a raintight seal, is arranged in the second larger-diameter channel 64, also cut into the contact face of the flange or counter-flange 56. A closed inter-seal volume 66 is thus created between the contact face of the flange or counter-flange 56, the contact face of the corresponding counter-flange (or flange) or insulating wafer, the first inner O-ring seal 58 and the second outer O-ring seal 60.

Also known in the art, an "L"-shaped leakage recovery duct 68 is provided in the flange or counter-flange 56. A radial portion 68A of this duct passes through the thickness of the flange or counter-flange 56 from the cylindrical outer lateral surface of the flange to a depth between the first (58) and second (60) O-ring seals. A transverse portion 68B of this duct, orthogonal to the plane shown in FIG. 4, extends inside the flange or counter-flange 56 orthogonally from the radial portion 68A towards the inter-seal volume 66. The L-shaped leakage recovery duct 68 thus connects the outside of the flange or counter-flange 56 to the inter-seal volume 66 without drilling the outer seal 60. In FIG. 4, it is shown closed by a knurled screw 70

A method for sealing a junction with contact surface and counter-contact surface of an element of the GIS compartment of FIG. 1 will now be described with reference to FIG. 5.

This method applies to the aforementioned junction between the lower part of the disconnecting switch 24 and the rupture disc 26, since this junction comprises two mechanical seals 28, 30 clamped between the contact surface and counter-contact surface, arranged so as to form a closed inter-seal volume reachable via a leakage recovery duct 32, as previously described with reference to FIG. 2.

It also applies to the aforementioned junction between the drive shaft 38 and the bore 40 via the jointed ring 42, since this junction comprises six mechanical seals 44, 46, 48, 50 clamped between the two pairs of contact surfaces and counter-contact surfaces, arranged so as to form two communicating and closed inter-seal volumes reachable via a leakage recovery duct 54, as previously described with reference to FIG. 3.

However, this method will be described in further detail for a flange and counter-flange junction such as, for example, any of the junctions in zones 14, 16, 18 and 20 of FIG. 1, which also have inner-seal volumes reachable via leakage recovery ducts, as described above with reference to FIG. 4. It can easily be generalized to the junctions in FIGS. 2 and 3, as well as to any junction with a closed inter-seal volume reachable via a leakage recovery duct.

A method for sealing according to the present invention also essentially comprises two phases. A first preliminary phase 100 for preparation and a second phase 200 for actual injection of sealing product.

The preliminary phase 100 begins with a step 102 for assembling a sealing product injection installation. A non-limiting example of such an installation is shown in FIG. 6.

During this assembly step 102, the knurled screw 70 is first removed from the leakage recovery duct 68 of the flange or counter-flange 56 and replaced by an element 86 for connecting a sealing product supply hose, for example a grease nipple with a non-return valve. In this case, it is advantageous to provide several grease nipples of different diameters to suit all possible configurations.

A supply hose 88, for example flexible and between 1 and 2 meters long, is connected to a motorized injector 90, for example an injection gun with sealing product cartridge(s), fitted at its injection end with a pressure gauge 92 for injection pressure control. Finally, the motorized injector 90 is connected to a compressor 94 which controls any variations in injection pressure.

In a subsequent step 104 of the preliminary phase 100, the sealing product is prepared.

In accordance with the general principles of the present invention, the sealing product is judiciously chosen to be, during injection, in the form of a liquid whose kinematic viscosity measured at 40° C. under 1 atm is greater than or equal to 3000 $mm^2$/s, i.e. an incompressible fluid whose high viscosity makes it possible to fill the leaks as it is injected into the inter-seal volume 66.

More precisely, according to an advantageous but non-limiting embodiment, the sealing product comprises an oil or grease, for example a silicone or fluoro-silicone grease whose kinematic viscosity measured at 40° C. under 1 atm is between 3000 and 7000 $mm^2$/s.

Also advantageously, the sealing product comprises solid microparticles which act as thickeners, in particular silica microbeads with sizes of 10 μm or less. Such particles can help the sealing process by mechanically accumulating on leakage areas.

In this case, it is further advantageous to choose a sealing product with good resistance to separation between the oil or grease, on the one hand, and the thickening microparticles, on the other hand. This is a separation value generally indicated in commercially available thickening oils or greases.

Finally, it is advantageous for the sealing product to have good resistance to water (e.g. rated at 0-90 according to standard DIN 51 807 pt.1) and extreme temperatures (e.g. a range of use including [−20° C.; +100° C.]).

The composition of such a silicone grease/silica microbead sealing product will not be further detailed, since it is commercially available and this composition is generally supplied by the manufacturer. The aforementioned properties of viscosity and, optionally, of solid microparticle content are sufficient to explain the effect of such a grease on the proper sealing of inter-seal volume 66, provided that a judicious injection protocol is also applied, as will be detailed below.

With such a choice of sealing product, it is advantageous to use mechanical seals 58, 60 made of acrylonitrile butadiene material or NBR (from "Nitrile Butadienne Rubber") known for its very good resistance to oils and greases. However, due to the high number of double bonds in the macromolecule, this material is sensitive to thermo-oxidative aging, ozone and ultra-violet radiation. It is also advantageous to use mechanical seals 58, 60 made of EPDM (from "ethylene propylene diene monomer"). This material is less stable in contact with oil or grease but, thanks to its low content of unsaturated bonds (saturated chain), it is less sensitive to temperature, humidity, oxygen, ozone and ultra-violet radiation, and therefore to aging. Moreover, some EPDM seal manufacturers choose an organic peroxide as a vulcanizing agent, which has the effect of improving the aging resistance of the final rubber compared to sulfurvulcanized EPDM. And some oils or greases are specifically designed not to damage NBR or EPDM seals.

The sealing product is placed in an injection cartridge suitable for insertion in the motorized injector 90. Alternatively, and for faster and simpler operation, it is supplied in a ready-to-use cartridge. Preparation step 104 then simply involves placing the ready-to-use cartridge in motorized injector 90.

The second phase 200 for actual injection of sealing product can then begin.

In a first step 202 of the second phase 200, the compressor 94 is set to a first set pressure Pmin, preferably greater than or equal to 10 bars, which is also measured at the outlet of the motorized injector 90 by the pressure gauge 92, where provided. A maximum pressure Pmax is also defined, for example 60 bars or more. Such a maximum pressure value is suitable for a junction with axially compressed mechanical seals, such as the flange and counter-flange pipe junction shown in FIG. 4.

In a second step 204 of the second phase 200, the sealing product is injected into the inter-seal volume 66 by the motorized injector 90. This injection is carried out under the set pressure of compressor 94, in particular by successive pressures in cycles, possibly monitored by pressure gauge 92, until a certain resistance is encountered in filling the inter-seal volume 66. At this stage, it is virtually full, but residual gas may still be present. The pressure may then drop slightly as a result of residual gas escaping via one of the two mechanical seals 58 or 60.

Then the set pressure is increased by a value ΔP, for example 1 bar or a few bars, in a step 206.

In a subsequent test step 208, the pressure measured at pressure gauge 92, or alternatively set at compressor 94, is compared with the Pmax value. If the Pmax value is not reached in a stable manner, the method is resumed in step 204 at the increased pressure.

The sealing product is thus injected under pressure by a plurality of successive increases in injection pressure. It is this gradual increase in pressure, combined with a sufficiently high viscosity of the sealing product, that enables any residual gas to be gradually expelled from the inter-seal volume 66 by pressurized leakage of this residual gas via at least one of the two mechanical seals 58 and 60.

By way of non-limiting example, the values of Pmin, ΔP and Pmax can be defined so that the plurality of successive increases comprises at least ten successive increases of at least 1 bar each, preferably at least twenty successive increases of at least 1 bar each up to a maximum stable pressure Pmax of at least 40 bars.

If in test step 208 the measured pressure reaches or exceeds the Pmax value in a stable manner, then it can be considered that no residual gas remains in the inter-seal volume 66 and the method is terminated in a final dismantling step 210.

During this step 210, the installation shown in FIG. 6 is dismantled, with only the connecting element 86 possibly remaining, particularly if it has a non-return valve, for future re-sealing.

Two configurations are possible at this stage:
everything is dismantled and the knurled screw 70 is reinserted into the leakage recovery duct 68, or
the connecting element 86 is retained, particularly in the case of a grease nipple with non-return valve.

It should be noted that the second configuration allows immediate resumption of sealing if necessary, particularly in the event of a subsequent leakage. It also makes it possible to identify that the junction in question has already been sealed. Finally, it enables the sealing product to be maintained under pressure Pmax in the inter-seal volume 66.

At the end of the method for sealing described above, the flange and counter-flange junction illustrated in FIGS. 4 and 6 is in the configuration shown schematically in FIG. 7.

It comprises two mechanical seals 58 and 60 clamped between the flange or counter-flange 56 and the other corresponding contact surface (respectively counter-flange or flange or insulating wafer), arranged so as to form the closed inter-seal volume 66 delimited by both of the mechanical seals 58, 60 and by the contact surface and counter-contact surface.

It further includes the sealing product, in particular silicone grease with silica microbeads, which is injected under pressure into the inter-seal volume 66 using the leakage recovery duct 68 which opens into the inter-seal volume 66.

Finally, the leakage recovery duct 68 is plugged by means of either the knurled screw 70 or the connecting element 86, particularly in the case of a non-return valve element.

This result visible on the flange and counter-flange junction shown in FIG. 7 can be generalized, as indicated above, to any junction with contact surface and counter-contact surface of a GIS compartment element comprising (at least) two mechanical seals clamped between the contact surface and counter-contact surface, arranged in such a way as to form a closed inter-seal volume delimited by two mechanical seals and by the contact surface and counter-contact surface, and a leakage recovery duct arranged in the thickness of the compartment to open into the inter-seal volume. In particular, it can be generalized to all the junctions referred to in FIGS. 1 to 3.

In the particular case of a junction with shaft and bore for a disconnecting switch, the pressure Pmax can be lower than the above-mentioned value, for example equal to 40 bars or a little more, but still less than 50 bars. Such a maximum pressure value is more generally suitable for a junction with radially compressed mechanical seals.

It clearly appears that a method for sealing such as the one described above enables internal sealing that is simple to implement, fast and effective, combining a judicious choice of sealing product viscosity with a gradual increase in injection pressure to ensure without damage the absence of any residual gas bubbles in the inter-seal volume after sealing.

The following additional advantages can also be noted:
such a method can be implemented whenever a junction with a contact surface and counter-contact surface, with two mechanical seals clamped between the contact surface and counter-contact surface and with a leakage recovery duct opening into the inter-seal volume is leaking, whether or not the leakage is localized,
the use of an oil or grease that retains its liquid state over time makes the sealing reversible without risk of damaging the junction,
the final cost of such a sealing, in terms of reusable tools (gauge, automated drilling system, compressor, motorized injector, pressure gauge), consumables (cartridges, hoses and connecting elements) and labor, is much lower than what is proposed in the state of the art, insofar as this also makes it possible not to lock out the structure, so that it can continue to operate,
the resulting sealing is just as effective over time (several years),
it increases the service life of the assemblies concerned without the need for a major overhaul.

It should also be noted that the invention is not limited to the embodiments described above. Indeed, it will be apparent to the person skilled in the art that various modifications can be made to the embodiments described above, in the light of the teaching just disclosed. In the detailed presentation of the invention given above, the terms used should not be interpreted as limiting the invention to the embodiments set out in the present description, but should be interpreted to include all equivalents the anticipation of which is within the reach of the person skilled in the art by applying their general knowledge to the implementation of the teaching just disclosed to them.

The invention claimed is:

1. A method for sealing a junction with a contact surface and counter-contact surface of an element of a compartment of a gas-insulating substation, said junction comprising two mechanical seals clamped between the contact surface and the counter-contact surface, arranged so as to form a closed inter-seal volume delimited by both of the two mechanical seals and by the contact surface and counter-contact surface, the method for sealing comprising an injection of a sealing product into the inter-seal volume using a leakage recovery duct arranged in a thickness of the compartment, this duct opening into the inter-seal volume, wherein:
during said injection, the sealing product is in the form of a liquid whose kinematic viscosity, measured at 40° C. under 1 atm, is greater than or equal to 3000 mm$^2$/s; and
the injection is carried out under pressure by a plurality of successive increases in injection pressure until any residual gas is expelled from the inter-seal volume by pressurized leakage of said residual gas via at least one of the two mechanical seals.

2. The method for sealing according to claim 1, wherein the sealing product comprises a silicone grease whose kinematic viscosity measured at 40° C. under 1 atm is between 3000 and 7000 mm$^2$/s.

3. The method for sealing according to claim 1, wherein the sealing product comprises solid microparticles.

4. The method for sealing according to claim 3, wherein the sealing product comprises silica microbeads with sizes less than or equal to 10 µm.

5. The method for sealing according to claim 1, wherein said injection is carried out using a grease nipple with a non-return valve connected to the leakage recovery duct and held in place after said injection.

6. The method for sealing according to claim 1, wherein the plurality of successive increases comprises at least ten successive increases of at least 1 bar each from a first injection pressure greater than or equal to 10 bars to a last injection pressure greater than or equal to 40 bars.

7. The method for sealing according to claim 6, wherein the plurality of successive increases comprises at least twenty successive increases of at least 1 bar each.

8. The method for sealing according to claim 1, wherein:
the element of the compartment of the gas-insulated substation is a pipe or pipe end through which electrical components pass in an insulating gaseous atmosphere;
the junction is a flange and counter-flange junction of said pipe or pipe end and comprises the two mechanical seals clamped between two respective flat contact surfaces of the flange and counter-flange; and
one of the two mechanical seals, forming an inner seal, being arranged inside a space delimited by the other of the two mechanical seals, forming an outer seal, so as to form the inter-seal volume, the method for sealing comprises using the leakage recovery duct which is arranged in at least one of the flange and the counter-flange.

9. The method for sealing according to claim 8, wherein the plurality of successive increases in injection pressure takes place up to a maximum injection pressure of at least 60 bars.

10. The method for sealing according to claim 8, wherein the insulating gaseous atmosphere is a sulfur hexafluoride atmosphere.

11. The method for sealing according to claim 1, wherein:
the compartment element of the gas-insulated substation is a disconnecting switch;
the junction is a shaft and bore junction of said disconnecting switch and comprises two mechanical seals clamped between two respective cylindrical contact surfaces of the shaft and the bore; and
both of the two mechanical seals being arranged at a distance from each other around the shaft so as to form the inter-seal volume, the method for sealing comprises using the leakage recovery duct which is arranged in the thickness of the compartment wherein the bore is formed.

12. The method for sealing according to claim 11, wherein the plurality of successive increases in injection pressure takes place up to a maximum injection pressure of at most 50 bars.

13. A junction with contact surface and counter-contact surface of an element of a compartment of a gas-insulating substation, comprising:
two mechanical seals clamped between the contact surface and counter-contact surface, arranged to form a closed inter-seal volume delimited by both of the two mechanical seals and by the contact surface and counter-contact surface;
a sealing product injected under pressure into the inter-seal volume using a leakage recovery duct arranged into a thickness of the compartment, the leakage recovery duct opening into the inter-seal volume;
wherein the sealing product is in the form of a liquid whose kinematic viscosity, measured at 40° C. under 1 atm, is greater than or equal to 3000 mm$^2$/s, in the inter-seal volume which it fills completely without residual gas.

* * * * *